Patented Oct. 18, 1938

2,133,559

UNITED STATES PATENT OFFICE 2,133,559

PROCESS OF TREATING COFFEE

Franklin J. Mushaben and Angelic E. Mushaben, Denver, Colo.

No Drawing. Application April 8, 1935, Serial No. 15,309

4 Claims. (Cl. 99—68)

This invention relates to improvements in methods of roasting and packing coffee for the trade.

It is now quite common practice to market roasted and cut or ground coffee in air-tight tins, but experience has shown that in spite of the precautions that are taken to retain the original flavor and aroma of the coffee and to prevent deterioration where coffee is exposed to the air after it has been roasted, and especially after it has been ground, changes do take place that have a deleterious effect on the coffee.

It is the object of this invention to provide an improved method of preparing coffee for the market which comprises the elimination of the skin or chaff, from the green product, as this chaff, when it is present during the roasting operation, will give to the coffee a bitter and burnt taste.

Another object of this invention is to roast the coffee under such conditions that it will not be exposed to the oxidizing action of air during the roasting operation or afterwards, thereby preventing deterioration from this source.

The above and other objects that may become apparent as this description proceeds, are obtained by means of a method which will now be described in detail.

The green coffee berries, after having been aged and thoroughly cleaned, are subjected to a cutting operation which produces coarse particles. This operation loosens the skin and produces a chaff that is then removed by a suitable fanning operation. After the first coarse cutting and the chaff removing operation, the coffee is reduced to the desired sized particles by another cutting operation. Green coffee berries are not suitable for reduction by grinding because they form a pulp, unless they are thoroughly dry, and if they are subjected to grinding instead of cutting, the skin will be pressed into the resultant particles or pulp in such a way as to preclude its removal, and this chaff, as above explained, will give the coffee a bitter and burnt taste if it is present during the roasting.

When the green coffee has been reduced to the desired sized particles, it is put into the containers in which it is to be sold to the consumer, and the containers are then sealed air-tight. The containers are not completely filled because the coffee swells somewhat during the roasting operation and space must be left to compensate for this increase in bulk.

The sealed cans are now subjected to the proper amount of heat to effect a roasting of the coffee in the containers; the containers are also subjected to agitation during the roasting. For the roasting operation, the cans are placed in a suitable oven or autoclave, which is then gradually raised to the required temperature which may vary but is usually somewhere between 350 and 400 degrees Fahrenheit.

During the roasting step, the heat tends to release ethereal and volatile oils and to increase the pressure within the container, and unless some precautionary measure is taken, the containers must be made strong enough to withstand such pressures. Where the heat is obtained from steam, the containers may be placed within a steam-tight chamber, and steam under the required pressure to produce the temperature desired, is introduced into the chamber and this will tend to counterbalance the pressure within the containers. It is also desirable to evacuate the containers before they are sealed, as this helps to keep down the pressure during the roasting operation, since the space occupied by the air will then be available for the gases.

It has been found that very satisfactory results are obtained if the otherwise sealed containers are each provided with a very small perforation, which permits the gases to escape during the roasting process and after the containers are removed from the roaster, and while the contents are still sufficiently hot to give off vapors, the vent hole is closed by a drop of solder. In the latter case, a large proportion of the air present in the container will be driven off and replaced by vapors from the coffee berry, and this is considered to be the most practical way of accomplishing the object sought.

The gist of applicants' invention resides in this, that the coffee is kept out of contact with air while it is being roasted and also after it has been roasted, as distinguished from methods where the coffee is put into sealed containers soon after it has been roasted.

It has been proposed to put ground green coffee into foraminous containers of non-combustible material and roast it, after which the containers are removed from the roaster and cooled and the containers are then covered with a coating of a soluble sealing substance. Such method permits air to come in contact with the coffee both during and immediately after the roasting and also permits the escape of the volatile oils and vapors driven off by the heat, which two things are prevented by applicants' process.

During the roasting operation the containers are subjected to agitation sufficient to agitate the contents, as a more uniform roast is thereby attained.

The cutting of the green coffee berries, as distinguished from grinding, is very important because, the cutting operation leaves the skin free so that it may be readily removed. If the coffee were ground, the chaff would become so thoroughly intermixed that it could not be removed and would burn during the roasting operation, thereby giving the coffee a bitter taste.

Where the coffee is roasted in sealed containers without being first evacuated or without the application of external pressure, the temperature is gradually raised to that required for roasting, as it has been found that the pressure generated in the containers is smaller when the contents are gradually heated than when the heat is suddenly applied.

The vent employed for the escape of gases and vapors from the containers is very small as its only function is to prevent the formation of pressures that may burst the containers, and since vapors are flowing outwardly through these vents during the roasting operation and until the contents have been cooled, these vents do not permit the entrance of gases of any kind during the time that the contents are hot enough to give off vapors.

What we claim and desire to secure by Letters Patent is:

1. The process of preparing commercial coffee for beverage use, comprising dissecting green coffee berries into particles, by cutting, as distinguished from grinding, thereby liberating the chaff of the berries, then removing the chaff from the dissected berries, then reducing the dissected berries to a predetermined size, then roasting the berries in a container, while insulated from the atmosphere, and maintaining the roasted product in the same container, against atmospheric influence.

2. The method of preparing commercial coffee for beverage use, comprising roasting disintegrated green coffee beans exclusive of their chaff, while atmospheric air is excluded from the beans.

3. The method of preparing commercial coffee for beverage use, comprising roasting disintegrated green coffee beans exclusive of their chaff, while atmospheric air is excluded from the beans, and continuously maintaining the roasted product against atmospheric influence during and after the roasting step, until use.

4. The process of preparing commercial coffee for beverage use, which comprises dissecting green coffee berries into particles, by cutting as distinguished from grinding, thereby liberating the chaff of the berries, separating the chaff from the particles, then roasting the particles in a container, while insulated from the atmosphere, and sealing the particles in the same container immediately after roasting.

FRANKLIN J. MUSHABEN.
ANGELIC E. MUSHABEN.